April 28, 1925.
C. H. DESAUTELS
AIR AND WATER INJECTOR
Filed June 30, 1922
1,535,401
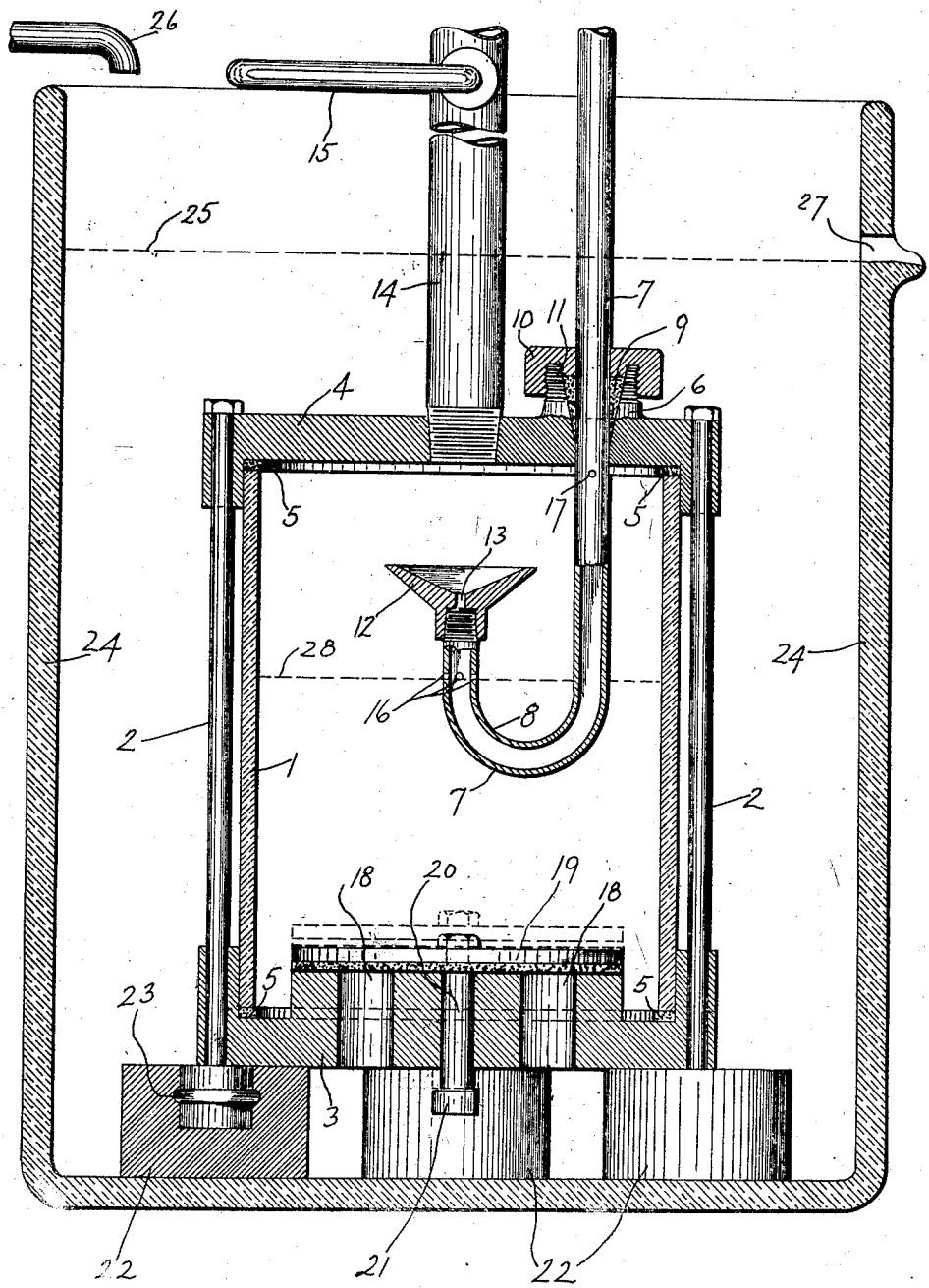
INVENTOR
Charles H. Desautels
BY
ATTORNEY Patented Apr. 28, 1925.

1,535,401

UNITED STATES PATENT OFFICE.

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

AIR AND WATER INJECTOR.

Application filed June 30, 1922. Serial No. 571,933.

*To all whom it may concern:*

Be it known that I, CHARLES H. DESAUTELS, a citizen of the United States of America, residing at Springfield, in the county of Hampden and State of Massachusetts, have invented certain new and useful Improvements in an Air and Water Injector, of which the following is a specification.

My present invention relates to a device adapted for supplying a definite measured quantity of water together with a charge of air in the inflation of the annular air bags used in the vulcanization of tire casings, although it is applicable to other uses.

For illustration, my invention will be described as applied to the manufacture of tire casings which are to be vulcanized while under internal fluid pressure. This pressure is generally supplied as compressed air, either directly to the internal chamber of the tire if the latter is of the single tube type, or to the chamber of an expansible air bag in case the tire is of the open-bellied type customarily used on automobiles. It is generally desirable, in order to improve vulcanizing conditions and to prevent drying out of the rubber with which the air comes in contact, to introduce a definite quantity of water into the tire or bag before vulcanization commences. Heretofore it has been necessary to introduce this water by a separate operation, but according to my invention I am enabled to carry on this step coincidently with the introduction of air pressure, thus saving time, equipment, and handling.

I will now proceed to describe the preferred embodiment of my invention in connection with the accompanying drawing, which represents the apparatus in transverse section.

A cylinder 1, preferably of transparent material such as glass, is clamped by bolts 2 between bottom and top heads 3 and 4 respectively to form a closed chamber, packing 5 serving to make water and air tight joints. Sliding through a boss 6 on the top head 4 is a pipe 7, having its bottom end turned upwardly as at 8. A packing 9 is pressed into position around the pipe by a nut 10 having an interior flange 11. By this means the pipe may be adjusted vertically. The upturned lower end of the pipe has screwed thereto a cup 12, presenting an aperture 13 leading into the pipe and surrounded by the outstanding walls of the cup. This aperture is positioned directly beneath an air pipe 14 through which compressed air may be admitted by a valve 15 as desired by the operator. Holes 16 are located in the pipe at a point below the cup, and a hole 17 is placed in it under the top head. The purposes of these holes will appear below. The bottom head is provided with a series of holes 18 normally closed by a clapper valve 19, the stem 20 of which passes through the head and has a flange 21 restricting upward movement of the valve. Feet 22 of rubber or other suitable material serve to raise the bottom head slightly so as to permit water to reach the holes 18, and are conveniently attached by vulcanizing them upon enlargements 23 of the heads of bolts 2.

The above apparatus is placed in a vessel 24, preferably of glass so that the operation of the device may be visible, in which water is kept by any suitable means at a level 25. A simple manner of accomplishing this is by permitting water to run in through a pipe 26, and providing an overflow 27 preventing accumulation of water beyond the desired level. Assuming that the vessel 24 contains water to the desired level, the water will completely fill the inner chamber formed by cylinder 1 and heads 3 and 4, clapper valve 19 permitting the water to enter through holes 18. Any air in the chamber will pass out through pipe 7, which of course will fill up to the level of water in vessel 24. Pipe 7 is now connected to the air bag or other article into which it is desired to introduce the air and water, and valve 15 opened to admit compressed air into the chamber. The first effect of this will be to depress the level of water in the inner chamber, the water being constrained to pass out pipe 7 as valve 19 closes tightly because of the pressure above it. Flow of water out of pipe 7 will continue until the water in the inner chamber reaches the level of holes 16, this level being indicated by 28. After this point has been reached no more water can be forced out, and compressed air will flow through pipe 7 until shut off by the operator closing valve 15. The amount of water is fixed by the apparatus, depending upon the vertical adjustment of pipe 7, but the amount of compressed air is variable according to the desires of the operator.

The cup 12 is desirable, as I have found that the form of cup illustrated eliminates disturbing churning of the water as the air is admitted, and greatly enhances the smooth operation of the device. If desired holes 16 could be eliminated, the flow of water stopping when its level reaches the top of the cup, but I prefer the arrangement shown. Furthermore, the aperture 13 in the cup can be omitted if desired, the main function of the cup being to break up the force of the downwardly directed jet of air. In this case all the water will enter pipe 7 through holes 16. If the cup 12 is fastened by a separate support the pipe 7 can be made straight and left open at the bottom end. These and other modifications which will suggest themselves are within the scope of my invention, as pointed out in the appended claims.

I have found that there is a tendency for water to siphon through the pipe 7 in case valve 15 is closed too soon, and to prevent this I have provided the hole 17, located in pipe 7 preferably near the top of the chamber. Entry of air into the pipe at this point effectively breaks any siphoning which would otherwise start.

Having thus described my invention, I claim:

1. A device for inflating objects with air and delivering a measured quantity of water at each inflation, comprising a container adapted to contain water, an inner chamber immersed in the water within the container, a valve in the chamber operable to admit water from the container to the chamber but not to allow it to pass in the other direction, an upwardly opening delivery pipe extending into the chamber, an aperture in the pipe below its opening, means for admitting compressed air to the chamber, a baffle adapted to prevent churning of the water by the air, and a second aperture in the pipe located above the water level and adapted to prevent siphoning of water from the chamber.

2. A device for inflating objects with air and delivering a measured quantity of water at each inflation, comprising a chamber adapted to contain water, a supply pipe adapted to introduce compressed air into the chamber, a delivery pipe having an opening below the normal water level in the chamber, a check valve adapted to permit water to flow into but not out of the chamber, and a source of water adapted to supply water to the chamber through the check valve at a pressure at all times less than that of the compressed air.

3. A device for inflating objects with air and delivering a measured quantity of water at each inflation, comprising a chamber adapted to contain water, a supply pipe adapted to introduce compressed air into the chamber, a delivery pipe having an opening below the normal water level in the chamber, and a second opening leading into it from about the top of the chamber, a check valve adapted to permit water to flow into but not out of the chamber, and a source of water of constant head adapted to supply water to the chamber through the check valve at a pressure at all times less than that of the compressed air.

CHARLES H. DESAUTELS.